May 1, 1945. C. W. MOTT 2,375,025
TRACTOR MOUNTED IMPLEMENT
Original Filed July 12, 1940 2 Sheets-Sheet 2
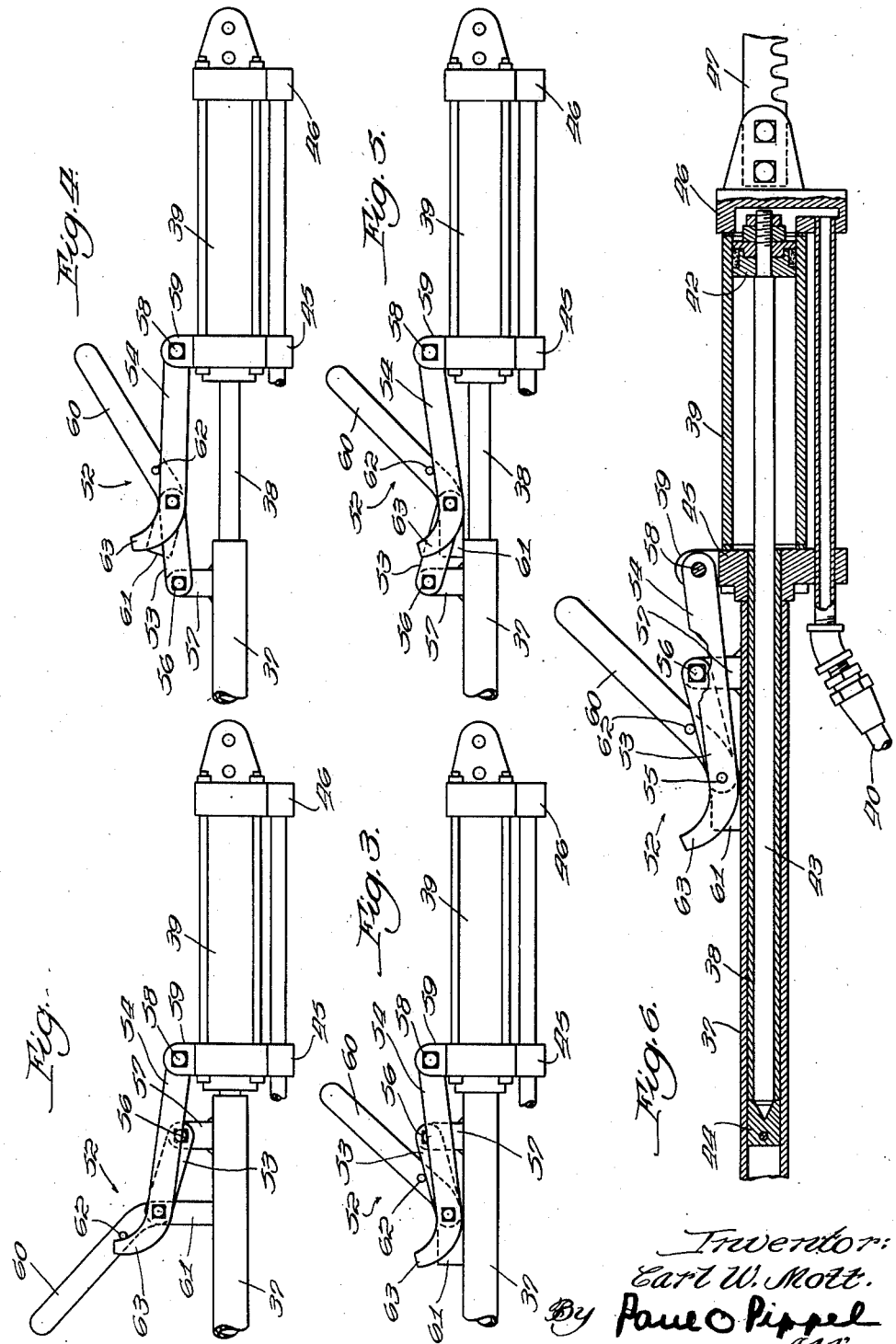

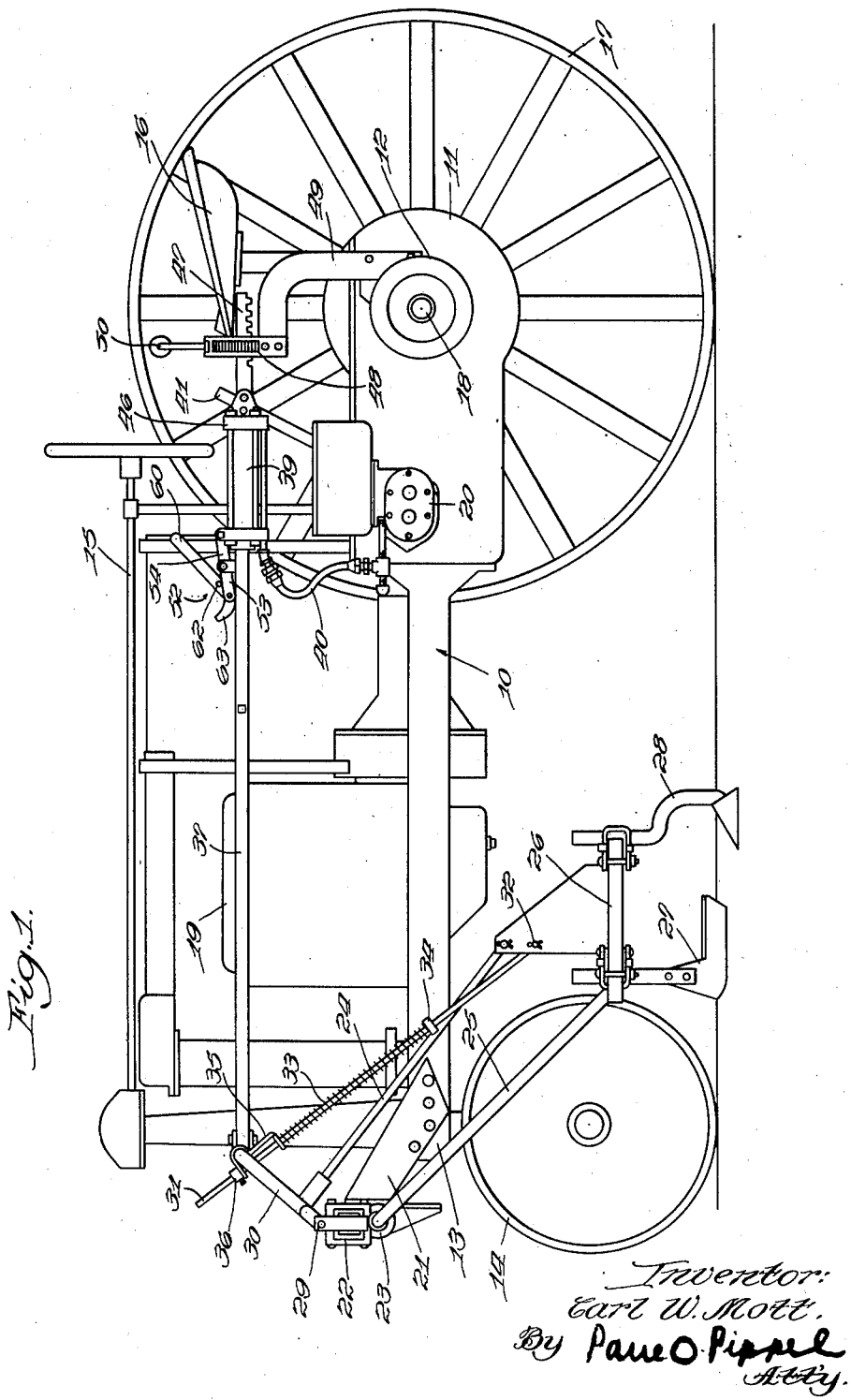

Patented May 1, 1945

2,375,025

UNITED STATES PATENT OFFICE 2,375,025

TRACTOR-MOUNTED IMPLEMENT

Carl W. Mott, La Grange, Ill., assignor to International Harvester Company, a corporation of New Jersey Original application July 12, 1940, Serial No. 345,144, now Patent No. 2,320,148, dated May 25, 1943. Divided and this application November 22, 1941, Serial No. 420,104

7 Claims. (Cl. 97—50)

This invention relates to tractor-mounted implements and more particularly to the lifting mechanism for moving the implements to and from their working positions. This application is a division of application Serial No. 345,144, filed July 12, 1940, and now issued into U. S. Patent No. 2,320,148, dated May 25, 1943.

It is an object of the present invention to provide a device for locking the ground-working implement in either its ground-working position or in its transport position, wherein little effort is required for the locking and unlocking operation.

According to the present invention, a toggle link arrangement is used for locking the ground-working tool in either its ground-working position or its transport position. This toggle locking arrangement is associated with the hydraulic power-lifting device and is attachable to the tractor with the same. The toggle arrangement is so constructed that the same can be actuated by the power-lifting mechanism without actually rendering the same effective to lock the implement in either of its positions. It is only when the operator desires that the same be locked that the toggle mechanism can be rendered effective to lock the working-tool structure in either of its positions.

For a better understanding of the invention, reference may be had to the following detailed description taken in connection with the accompanying drawings, in which:

Figure 1 is a side elevational view of a tractor with an implement attachment connected thereto and with power mechanism embodying the features of the present invention;

Figures 2 and 3 show the hydraulic device in its unextended position and the toggle mechanism in respectively its unlocked and locked positions;

Figures 4 and 5 show the hydraulic mechanism in its extended position and the toggle link mechanisms respectively in their unlocked and locked positions; and Figure 6 shows an enlarged detail view in section of the hydraulic mechanism and of the sleeve to which the same is connected with the toggle link mechanism in its locked position.

Referring now particularly to Figure 1, there is shown a tractor 10 having a rear portion 11 with a rear axle structure 12 and a forward portion 13 supported upon a dirigible wheel 14 adapted to be operated by steering mechanism 15 accessible to an operator's station 16 on the rear portion 11 of the tractor. The rear portion of the tractor 11 is supported on a traction wheel 17 adapted to be driven by a rear axle 18 extending through the rear axle structure 12 of the tractor. Within the rear portion 12 of the tractor is mechanism adapted to be driven by a power plant 19 carried by the forward portion 13 of the tractor and having power take-off connections such that there is operated a hydraulic pump mechanism 20.

Carried by the forward portion 13 of the tractor is a bracket structure 21 having a transversely extending portion 22 to which is connected, in laterally spaced relation from the tractor, a bracket structure 23. This bracket structure 23 has connected to it a pair of vertically spaced upper and lower links 24 and 25 to the lower end of which is connected a working-tool structure 26 having cultivating tools 27 and 28. Connected to the transverse structure 22 for fore and aft pivotal movement about a pivot point 29 is a lifting lever 30 to the free end of which is connected a lift rod 31. This lift rod 31 is connected at its lower end to the rig structure 26 as indicated at 32 and carries a pressure spring 33 adapted to act against a collar 34 to keep the working tools 27 and 28 in their ground-working position. This pressure spring 33 is only effective when the lever 30 is maintained against pivotal movement in a manner to be described hereinafter. The upper end of the spring 33 will then react against a member 35 carried by the upper end of the lever 30 through which the lift rod 31 extends. When it is desired to lift the rig structure 26, forward pivotal movement of the lever will cause the member 35 to engage with a set collar 36 on the upper end of the lift rod 31. As the lever goes forward, it will carry with it the rod 31 and thus cause pivotal movement of the rig structure 26 and the links 24 and 25 about the pivotal connection of these links with the bracket structure 23 on the transverse member 22.

Also connected to the upper end of the lever 30 is a longitudinally extending lift pipe 37. Referring now particularly to Figure 6, it will be noted that this lift pipe is hollow and is adapted to receive a sleeve portion 38 forming a part of a fluid cylinder device 39. The fluid cylinder device 39 is connected to the pump mechanism 20 by means of a fluid coupling 40. As the fluid mechanism 20 is operated by a control lever 41, also accessible to the operator's station 16, fluid will be caused to flow to the fluid cylinder device 39 to cause a piston 42 enclosed within the device to move forwardly and to thrust a piston rod 43 against a stop member 44 carried within the pipe 37. When the fluid cylinder device is collapsed in the manner shown in Figure 6, the rear end of the sleeve 37 will abut a cylinder head member 45 forming a part of the cylinder device 39. As the piston rod 43 goes forward, the rear end of the sleeve 37 will leave the head member 45 and will continue to be supported on the sleeve 38 forming a part of the cylinder device 39.

On the rearward end of the cylinder device 39 is a head member 46 to which is connected a rack member 47 adapted to be supported over a pinion mechanism 48. This pinion mechanism 48 is supported on a bracket 49 carried by the rear axle structure 12 of the tractor. The pinion mechanism 48 is operated by a rotatable crank element 50 accessible to the operator's station 16. This pinion mechanism will serve to adjust the working tools 28 to their desired working depth. In this adjustment the cylinder device 39 and the sleeve 37 are bodily adjusted either forwardly or rearwardly.

Coming now more particularly to the feature of the invention, there is provided a toggle lock mechanism indicated generally at 52 and connected between the rear portion of the sleeve 37 and the head member 45 of the fluid cylinder device 39.

It will be noted that the fluid cylinder device 39 is of a single-acting type. Thus, when the device is collapsed and the piston 42 is in the rearward end of the device, means is necessary for locking the sleeve 37 against the head member 45 in order that the pressure spring 33 will be effective to maintain the working tools 27 and 28 in their ground-working position. Hence, there has been provided the toggle lock mechanism 52. This toggle mechanism comprises a pair of short and long toggle links 53 and 54 having a common pivot point 55. The short link 53 is pivotally connected as indicated at 56 to a lug 57 on the rear portion of the sleeve 37. The long link 54 is pivotally connected, as indicated at 58, to a lug 59 formed on the head member 45. At the point of connection 55 of the two links with each other, there is pivoted a hand-operated member 60 having on its lower end a cam portion 61. This hand member is accessible to the operator's station 16, and when the working tools 27 and 28 are in their ground-working position, the manual lever 60 is brought rearwardly so that a lug 62 thereon will contact the links 53 and 54 rearwardly of the point of connection 55 to throw the same downwardly over center to the position shown in Figure 6. In this manner the sleeve 37 will be locked to the fluid cylinder device 39, and spring pressure will then be applied to the working tools 27 and 28. The working tools 27 and 28 will then be positively held in their working position and the piston 42 will be retained against forward sliding movement.

Prior to the toggle mechanism 52 being thrown into the locked position shown in Figures 3 and 6, the mechanism will have assumed a position such as shown in Figure 2. In the position shown in Figure 2, the toggle links have not been thrown to an over-center position and, hence, the sleeve will not be positively retained against sliding movement relative to the head member 45. It will be noted that in the position shown in Figure 2 the handle 60 extends forwardly. The pin 62 on the handle portion 60 bears against a hooked portion 63 formed on the long link 54. The free ends of the links or the pivot connection 55 will be supported by the portion 61 formed on the handle 60. This portion 61 prevents the links from going to an over-center position by abutment with the sleeve 37. In this position, as shown in Figure 2, the sleeve may extend forwardly of the head member 45, and the lifting operation can thereby take place without any change in the toggle mechanism so that the rig 26 can be lifted to its transport position.

As the hand lever 60 is pulled rearwardly so that the portion 61 will extend along the sleeve 37, as shown in Figure 3, the links 53 and 54 will drop downwardly to their over-center position. In this position the sleeve 37 will be positively locked against movement. The spring 33 then becomes effective and in order that lifting operation can then take place, it will then be necessary that the handle 60 be returned to the position shown in Figure 2. As long as this lever 60 is not thrown to the position shown in Figure 3, lifting movement can take place as many times as desired without the operator having to meddle with the toggle mechanism. It is only when the operator desires to lock the rig 26 in its working position that he pulls the lever 60 to the position shown in Figure 3.

Referring now particularly to Figures 4 and 5, the toggle mechanism is shown extended with the links respectively in their normal and over-center positions. The sleeve 37 has been extended to effect movement of the rig structure 26 to its transport position, and, as in the position shown in Figures 2 and 3, the rig structure will not be locked in its transport position unless the hand lever 60 is pulled rearwardly to throw the links downwardly to the over-center position shown in Figure 5. As long as the links are not tampered with and remain in the position shown in Figure 4, the cylinder device can be readily collapsed by merely extracting the fluid from the fluid cylinder device 39. But once the links are thrown into the locked position of Figure 5, it will be necessary that the levers be pivoted forwardly to unlock the same, whereupon the portion 61 of the lever will engage with the rear end of the sleeve 37. It is often desirable to lock the working tool in its transport position to thereby relieve the fluid cylinder device of the fluid pressure required to maintain the rig structure in its transport position. Also, where working tool rigs are provided on the opposite side of the tractor, as is common with the usual cultivating equipment, and it is desired only to operate or cultivate with the tools on the one side of the tractor, means is necessary for locating the tools at the opposite side of the tractor in their transport position to thereby render the fluid cylinder device ineffective upon those tools. In such instance only, the tools at the one side of the tractor would be operated by the cylinder at that side of the tractor.

It should now be apparent that there has been provided a locking mechanism for locking the working tool structure in either its working or transport positions that is of a type which is easy to manipulate and one which is effective for locking only at the will of the operator. Fore and aft movement of the lifting pipe 37 may take place continually without interference of the toggle mechanism unless the operator has thrown the toggle mechanism into its locked position. From this latter point of view the toggle mechanism has a desirable advantage over a latch type of locking mechanism.

While various changes may be made in the detail construction of the present invention, it shall be understood that such changes shall be within the spirit and scope of the present invention as defined by the appended claims.

What is claimed is:

1. In combination, a frame, an implement connected to the frame for movement to and from its working position, a power arrangement for moving the implement with respect to the frame including power-actuating means and means for connecting the same with the implement, and a toggle link mechanism including parts respectively connected with said frame and with the connecting means and manually settable at will while the implement is in its working position, to positively lock the implement in such position.

2. In combination, a frame, an implement connected to the frame for movement to and from its working position, a power arrangement for moving the implement with respect to the frame including power-actuating means and means for connecting the same with the implement, and a toggle link mechanism including parts respectively connected with said frame and with the connecting means and manually settable at will while the implement is in either its working position or in a position removed from its working position, to lock the implement in the position occupied thereby at the time the toggle link mechanism is set.

3. In combination, a frame, an implement connected to the frame for movement to and from its working position, a fluid power arrangement for moving the implement with respect to the frame including fluid-actuating means and extensible linkage means for connecting the same with the implement having two relatively movable parts, and a toggle link mechanism connected between the two parts and manually settable at will while the implement is in either its working position or in a position removed from its working position, to lock the implement in the position occupied thereby at the time the toggle link mechanism is set.

4. In combination, a tractor, an implement connected to the tractor for vertical movement to and from its ground-working position, a fluid power arrangement for moving the implement with respect to the tractor including a fluid-actuating cylinder device having a projecting sleeve portion, connection means between the implement and cylinder device including a pipe telescoping with said projecting sleeve portion, a toggle mechanism located between the pipe and the cylinder device for locking the pipe with respect to the sleeve, whereby the implement may be retained in either its working or lifted positions.

5. In combination, a tractor, an implement connected to the tractor for vertical movement to and from ground-working position, means connected with the implement to move the same, and toggle link mechanism manually manipulatable while the implement is in both its ground-working position and in its position removed therefrom, to lock the implement in the position occupied thereby at the time of such manipulation of the toggle link mechanism.

6. In combination, a tool-supporting frame, a working-tool structure connected to the tool-supporting frame for movement from one position to another position, tool-moving means connected to the working-tool structure to move the same, and toggle link mechanism manually settable for locking the working-tool structure in either of its positions, said toggle link mechanism being adjustable under control of the tool-moving means to conditions of adjustment respectively assumed while the working tool structure is in said positions and from either of which conditions from which it is manually settable as aforesaid.

7. In combination, a tool-supporting frame, a tool structure movable into different positions on said frame, tool-moving means operably connected with the tool structure and manipulatable to place said tool structure in either of said positions, pivotal anchorage means comprising parts respectively fixed with respect to the frame and movable with said tool-moving means, said pivotal anchorage means parts being spaced apart and thus determining the position of a center line intersecting both of said parts, a shorter spacing of said anchorage means parts being incurred when the tool-moving means is manipulated to place the tool structure in one of said positions and a greater spacing of said anchorage means parts being incurred when the tool-moving means is manipulated to place the tool structure in the other of such positions, and a toggle device comprising toggle links respectively pivoted to said anchorage means parts and pivoted to one another to form a toggle joint, said toggle links being constructed and arranged so that said joint is at a location between said anchorage means parts when the latter are at the greater spacing and so that said joint is disposed at a location generally oppositely to one of the anchorage means parts from the other along said center line when said parts are at the shorter spacing, said toggle joint being normally upon an unlocking side of said center line when in either of said locations to avoid interference with manipulation of the tool-moving means, but said joint being manually displaceable transversely of the center line while in either of said locations to lock the toggle device and prevent manipulation of the tool-moving means.

CARL W. MOTT.